United States Patent [19]

Leterme et al.

[11] Patent Number: 4,719,614
[45] Date of Patent: Jan. 12, 1988

[54] OPTICAL RECORDING-READING HEAD USING AN ADJUSTABLE MOUNT FOR PIVOTING MIRROR

[75] Inventors: Dominique Leterme, Orsay; Jean-Pierre Le Merer, Pavillon sous Bois, both of France

[73] Assignee: Thomson-CSF, Paris, France

[21] Appl. No.: 21,512

[22] Filed: Mar. 9, 1987

Related U.S. Application Data

[60] Continuation of Ser. No. 873,483, Jun. 12, 1986, abandoned, which is a division of Ser. No. 611,545, May 17, 1984, abandoned.

[30] Foreign Application Priority Data

May 20, 1983 [FR] France ................ 83 08429

[51] Int. Cl.$^4$ ............................................. G11B 7/12
[52] U.S. Cl. .................................... 369/110; 369/44; 369/112
[58] Field of Search .............. 369/44, 45, 46, 110, 369/109, 111, 112

[56] References Cited

U.S. PATENT DOCUMENTS

| T953,002 | 12/1976 | Firester . | |
|---|---|---|---|
| 3,493,296 | 2/1970 | Albert | 350/632 |
| 4,011,003 | 3/1977 | Dragt | 369/44 |
| 4,209,804 | 6/1980 | Dil . | |
| 4,390,781 | 6/1983 | Musha | 369/45 |
| 4,527,263 | 7/1985 | Nakagawa | 369/46 |
| 4,533,826 | 8/1985 | Van Alem | 369/45 |
| 4,542,492 | 9/1985 | Leterme et al. | 369/46 |
| 4,564,931 | 1/1986 | O'Hara et al. | 369/110 |
| 4,573,149 | 2/1986 | Deguchi et al. | 369/46 |

FOREIGN PATENT DOCUMENTS

| 3112814 | 2/1982 | Fed. Rep. of Germany . | |
|---|---|---|---|
| 55-93114 | 7/1980 | Japan | 350/632 |
| 1111356 | 4/1968 | United Kingdom . | |
| 2016635 | 9/1979 | United Kingdom . | |

*Primary Examiner*—Donald McElheny, Jr.
*Attorney, Agent, or Firm*—Oblon, Fisher, Spivak, McClelland & Maier

[57] ABSTRACT

An optical head is provided for an information carrier recording-reading device. Such an optical head comprises a pivoting mirror for reflecting the light towards the data carrier. According to the invention, this pivoting mirror is mounted on a pivoting seat having a sliding surface and resting on the sliding surface of the cradle shaped base. Said mirror is mounted on the seat so that the center of curvature of the sliding surfaces is in the reflecting plane of the mirror. Adjustment of the orientation of the mirror is thus made easy.

18 Claims, 12 Drawing Figures

QUARTER WAVE PLATE

QUARTER WAVE PLATE

OPTICAL RECORDING-READING HEAD USING AN ADJUSTABLE MOUNT FOR PIVOTING MIRROR

This application is a continuation of application Ser. No. 06/873,483 filed on June 12, 1986, abandoned, which is a Divisional of abandoned parent application Ser. No. 06/611,545, filed May 17, 1984.

BACKGROUND OF THE INVENTION

1. Field of the Invention

The invention relates to optical recording-reading systems using as information carrier an optically recordable and readable disk, information being recorded in the form of a disturbance of a radiation sensitive layer, for example a heat sensitive layer.

2. Description of the Prior Art

In these systems, the optical radiation is shaped by an assembly called optical head which may comprise: a GaAs semi-conductor laser, a collimating lens, a polarization separator assembly, a quarter-wave plate, a pivoting reflecting mirror, a lens for focusing on the disk, an assembly of servomotors for focusing on the disk and for tracking and photodetection cells for identifying the information read from the prerecorded disk or after storage of information.

The light beam emitted by the laser source after reflection from the reflecting mirror is focused by the focusing lens and supplies a luminous spot on a track of the information carrier. The reflecting mirror pivots about a pivot so as to allow movement of the spot transversely with respect to the track. It is then possible to ensure that the spot follows the track.

However, setting the mirror in an optimum position for supplying a reflected beam in a given direction requires great accuracy in the manufacture of the mirror pivot.

Furthermore, the recording-reading devices for disks may have their optical head mounted either on a head supporting device moving in translation along the radius of the disk, controlled by a motor, or at the end of an arm whose pivotoing center is outside the surface of the turntable driving the disk.

It is advantageous for the head to have an elongated form and to be disposed, depending on the case, along the translating or traversing device or in the extension of the arm. In one case, the large dimension of the optical head is then disposed transversely with respect to the track and in the other case it is aligned. Radial tracking by the spot with the help of the pivoting member poses then a problem for using the seam head in both head support configurations.

SUMMARY OF THE INVENTION

The invention relates to a mount for a mirror in an optical head which solves these problems and more especially a head which does not require a particular accuracy in manufacture of the pivot for the mirror, which is compact, elongate in shape, simple to adjust, and adaptable on different tracking devices ((by radial translation or by a rotating arm).

The invention provides then an adjustable mount for a mirror, comprising a base in the form of a cradle comprising a sliding surface having a center of curvature, a pivoting seat having a sliding surface of the same curvature as the preceding surface and being applied thereagainst, the mirror being supported by the pivoting seat so that the center of curvature is in the reflecting plane of the mirror.

BRIEF DESCRIPTION OF THE DRAWINGS

The invention will be better understood and other features will appear from the following description and the accompanying Figures in which.

DESCRIPTION OF THE PREFERRED EMBODIMENTS

Figure 1:
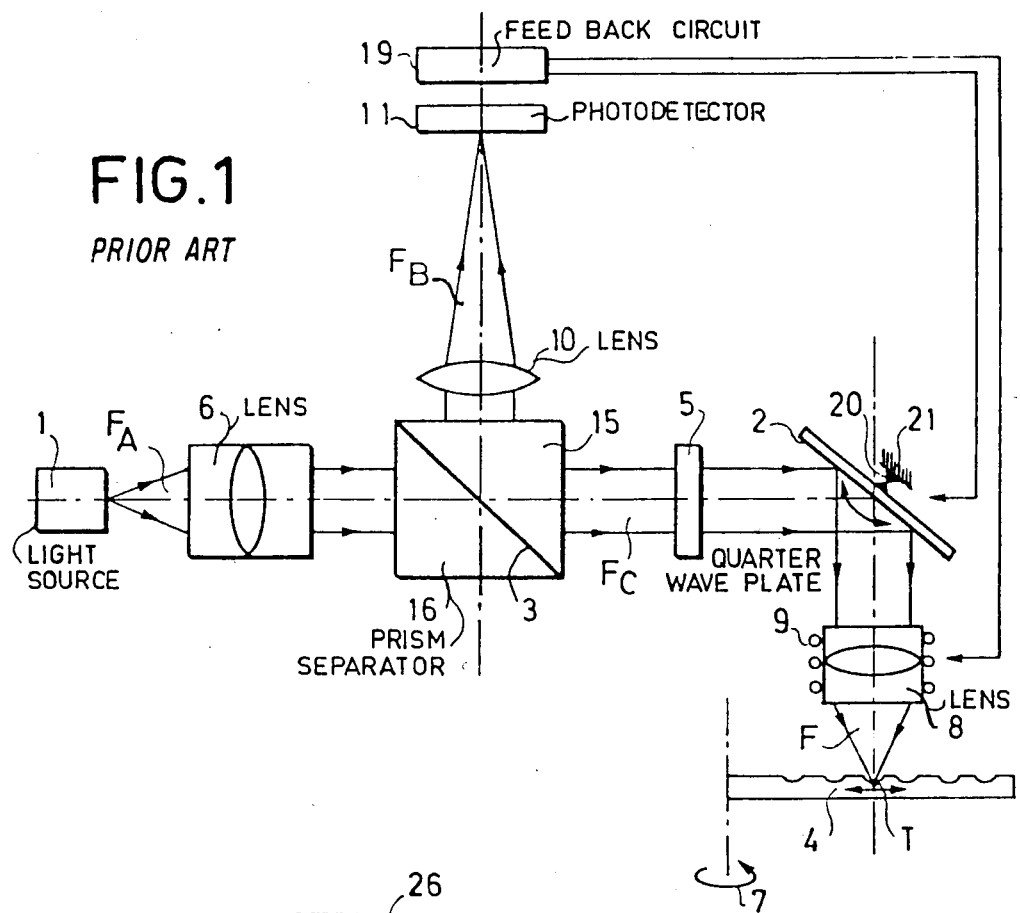
FIG. 1 shows the explanatory diagram of an optical head of a known type.

FIG. 1 shows a device of the prior art.

In this Figure, a laser source 1 emits a linearly polarized divergent beam $F_A$. A collimating lens 6 receives this beam $F_A$ and transmits a beam of parallel rays to a polarization beam splitter device 15-16. This device 15-16, which comprises two prisms 15 and 16, has an interface 3 treated so as to reflect the polarized light in a plane perpendicular to the incident plane on the one hand, and, on the other hand, to transmit the polarized light in the incidence plane in the form of a beam $F_C$. A quarter-wave plate 5 transforms the beam $F_C$ with rectilinear polarization into a beam with left or right circular polarization. A pivoting mirror 2 reflects the beam emerging from plate 5 to a lens 8 which focuses the beam F at a point T on the information carrier 4.

Depending on the type of information present at point T, beam F is liable to be reflected towards lens 8 in the form of a beam with circular polarization. Mirror 2 reflects the light towards the quarter - wave plate 5 which transforms the beam with circular polarization into a beam with rectilinear polarization crossed in the direction of device 15-16. The interface 3 receives a beam whose plane of polarization is this time perpendicular to the incidence plane of the light. Face 3 reflects this beam towards a converging lens 10 which delivers a beam $F_B$ focused on a photodetector device formed of photodetection cells 11.

It is then apparent that depending on the nature of point T of the information carrier, a reflected beam may be detected by the photodetection cells 11. Since the information carrier 4 is a disk driven with a rotational movement 7, the information may be disposed in the form of concentric or spiral circular tracks. With the disk rotating in the direction of arrow 7, the information travels past the lens 8 of the optical head for recording or reading data.

Mirror 2 pivots about a pivot 20 fixed to a fixed support 21. It may pivot in a direction shown by the double arrow drawn in the vicinity of the pivot. Such pivoting of the mirror results in moving the focusing spot of beam F over the information carrier in the direction of the double arrow shown close to point T. It is then possible, by suitably orientating mirror 2, to move the focusing spot, by means of a motor not shown, over the information carrier 4 so that it always falls on a track of data elements. Thus tracking by beam F is obtained.

A control device 19 is further provided for controlling, depending on the results of the detection made by cells 11, on the one hand correct focusing of lens 8 and, on the other hand, orientation of mirror 2.

Such a system gives rise to manufacturing problems in so far as mirror 2, pivot 20 and support 21 must be positioned as accurately as possible, the error in orientation of mirror 2 resulting from its pivot 20 having to be as small as possible. Such an error of orientation occurs when the tracking pivot 20 is formed by a profile with constricted portion made from elastomer material.

Figure 2:
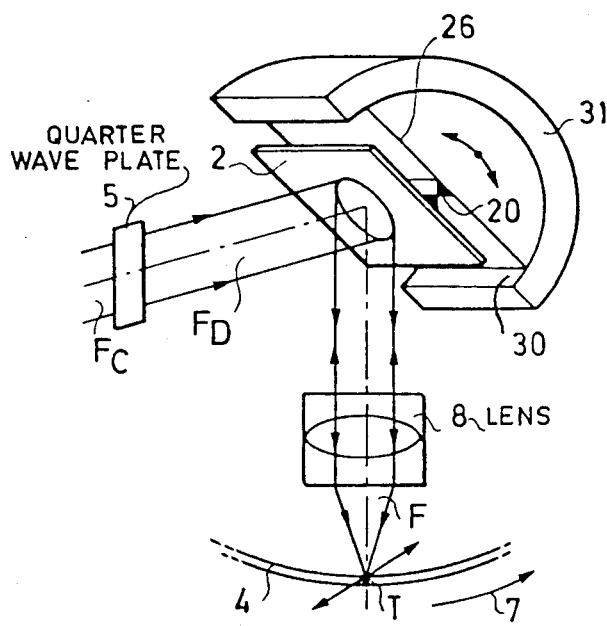
FIG. 2 shows the explanatory diagram of one embodiment of the adjustable mount in accordance with the invention in which the seat supporting the mirror has a cylindrical shape.

Referring to FIG. 2, the explanatory diagram of one embodiment of the adjustable mount of the invention will now be described.

In FIG. 2, we find again the quarter - wave plate 5, mirror 2 with its pivot 20, lens 8, the information carrier 4 shown in the form of a track moving in the direction shown by arrow 7, the information point T.

In accordance with the invention, pivot 20 is fixed to a pivoting seat 26 having a cylindrical sliding face resting on another cylindrical surface 30 having the same curvature and belonging to base 31 in the form of a cradle.

Piece 26 may oscillate inside the cylindrical surface 30 with a rotational movement indicated by the double arrow shown on face 26.

Mirror 2 and its pivot 20 are fixed to the pivoting seat 26 so that the axis of the cylindrical surfaces merges with the reflecting plane of mirror 2. Furthermore, pivot 20 is parallel to the axis about which the pivoting seat 26 pivots.

Thus, during adjustment of the position of mirror 2 for correcting an angular deflection of the axis of beam F with respect to the plane of information carrier 4, it will be sufficient to suitably orientate piece 26, mirror 2 being in a median position with respect to its pivot 20. The pivoting seat 26 will then be immobilized in base 31. Tracking will be provided by pivoting of mirror 2 about pivot 20 as described above.

The advantage of this arrangement is to correct angularly the error in orientation of the mirror without the conditions of reflection of the axial ray of beam $F_D$ being modified except for the angular deviation. It is then possible to obtain a correct balanced position of the mirror by obtaining centered illumination of the pupil of the lens 8.

In a variant of the invention, the sliding surfaces are advantageously spherical.

Figure 3:
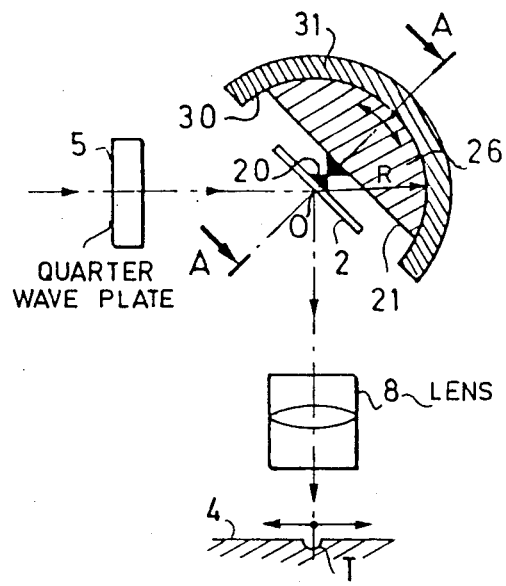
FIGS. 3 to 6 show explanatory diagrams of embodiments of the adjustable mount of the invention in which the seat supporting the mirror has a spherical shape.
Figure 4:
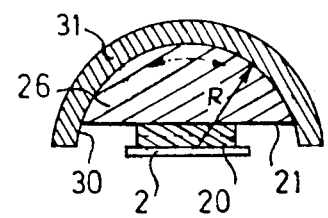

FIGS. 3 and 4 show the explanatory diagrams of one embodiment of the orientation system of the invention in which the sliding surface of the pivoting seat 26 is spherical.

In FIG. 3, we find again the quarter - wave plate 5, mirror 2, pivot 21, the pivoting seat 26, surface 30 of base 31, lens 8 and the information carrier 4.

FIG. 4, representing a section through AA of FIG. 3, shows that the sliding surface of the pivoting seat 26 is in the shape of a spherical skull cap with radius R. It is housed in a spherical cavity of the same radius R in base 31. It may pivot in the cavity in two directions and also rotate along a radial axis by sliding of the spherical surfaces. Mirror 2 and its pivot 20 are mounted on the flat face of seat 26 with the center O of the spherical surface 30 of base 31 situated in the relfecting plane of mirror 2.

The use of a spherical orientation system has the advantage of providing adjustment of the position of a mirror which would be pivotable along several pivoting axes, while keeping the center of the mirror in the axis of the optical system of the invention.

Furthermore, the spherical shapes of the pivoting seat 26 and of surface 30 allow pivot 20 to be oriented in any desired direction while allowing transverse scanning of the track of the information carrier.

In FIG. 3, the light ray situated along the axis of the incident beam is considered and has been shown by a dash dot line. The incidence plane of this ray on the information carrier is perpendicular to the tracks. When mirror 2 is caused to pivot about its pivot 20, the spot moves perpendicularly to the track. We then have tracking by the spot.

Figure 5:
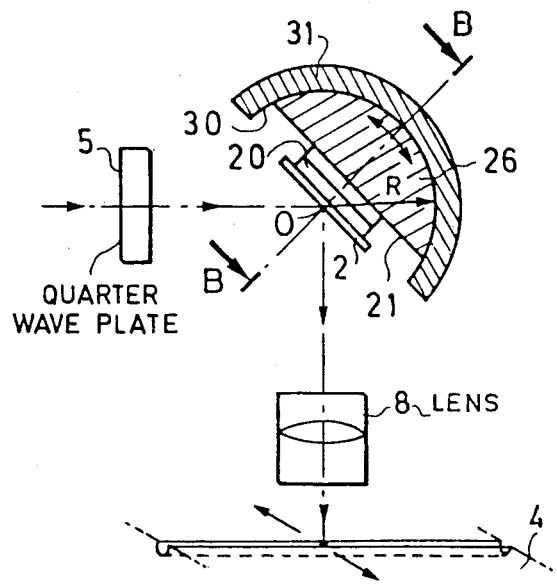
Figure 6:
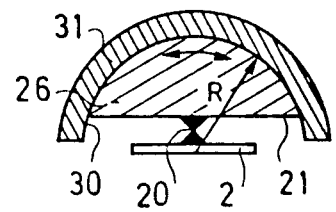

In FIG. 5, the incidence plane of the same light ray on the information carrier is parallel to the track. For ensuring the same tracking and so moving the spot perpendicularly to the track, pivot 20 has been rotated by 90° with respect to its position in FIG. 3. This operation has been made possible by rotating the pivoting seat 26.

The mount of the invention finds different applications such as those described with reference to FIGS. 7 to 10.

Figure 7:
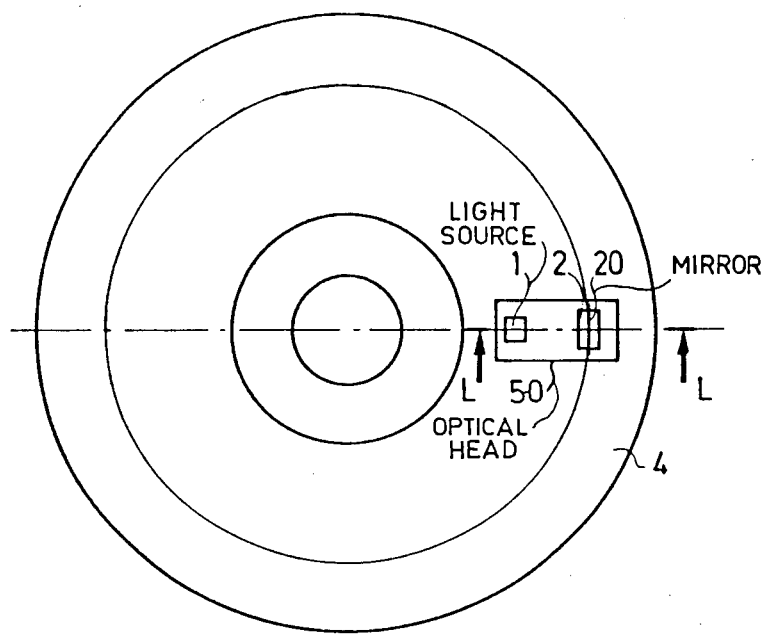
FIGS. 7 and 8 are diagrams explaining the use of the adjustable mount of the invention in a radial translation tracking device.
Figure 8:
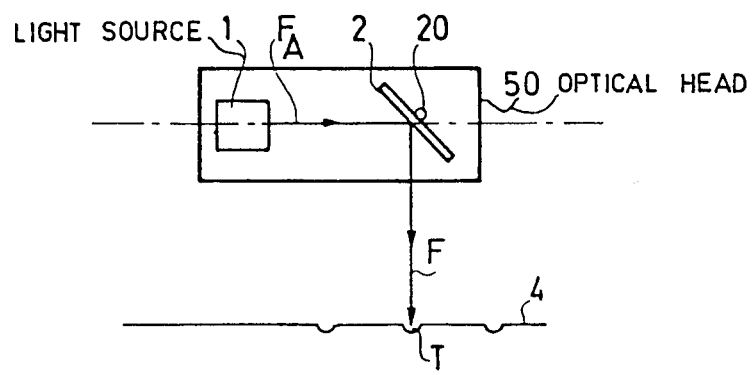

In FIGS. 7 and 8, the optical head of the invention is used in connection with a head support moving in radial translation with respect to the disk controlled by a linear motor for example. In FIG. 7, the large dimension of the optical head is disposed along a radius of a disk. The incidence plane of the axis of the beam mentioned in the description of FIG. 3 is perpendicular to the tracks of disk 4. Pivot 20 is contained in a plane tangent to the track to be read. In FIG. 8, it can then be seen that pivoting of the mirror about pivot 20 provides track following.

Figure 9:
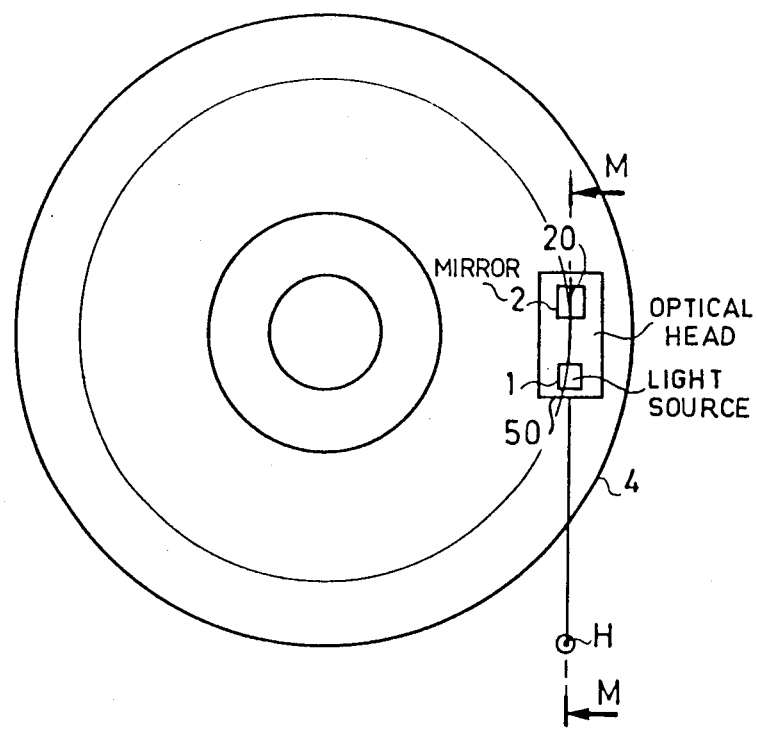
FIGS. 9 and 10 show diagrams explaining the use of the adjustable mount of the invention in a rotary arm tracking device.
Figure 10:
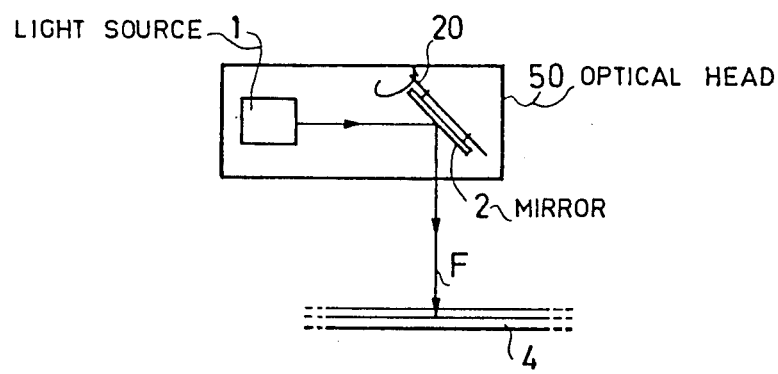

FIGS. 9 and 10 show the same optical head as the one in FIGS. 7 and 8. It is here used with a drive device formed by a rotating arm pivoting about an axis H situated outside the turntable for the disk. The incidence plane of the axis of a beam is substantially tangent to the tracks of the disk 4. Pivot 20 is contained in a plane substantially tangent to these tracks. It can then be seen that rotation of mirror 2 about pivot 20 causes movement of the spot transversely with respect to the tracks and ensures track following.

We pass from the version shown in FIGS. 7 and 8 to the version shown in FIGS. 9 and 10 by a 90° rotation of the seat of mirror 2 in the cradle shaped base so that the optical head is universal.

Figure 11:
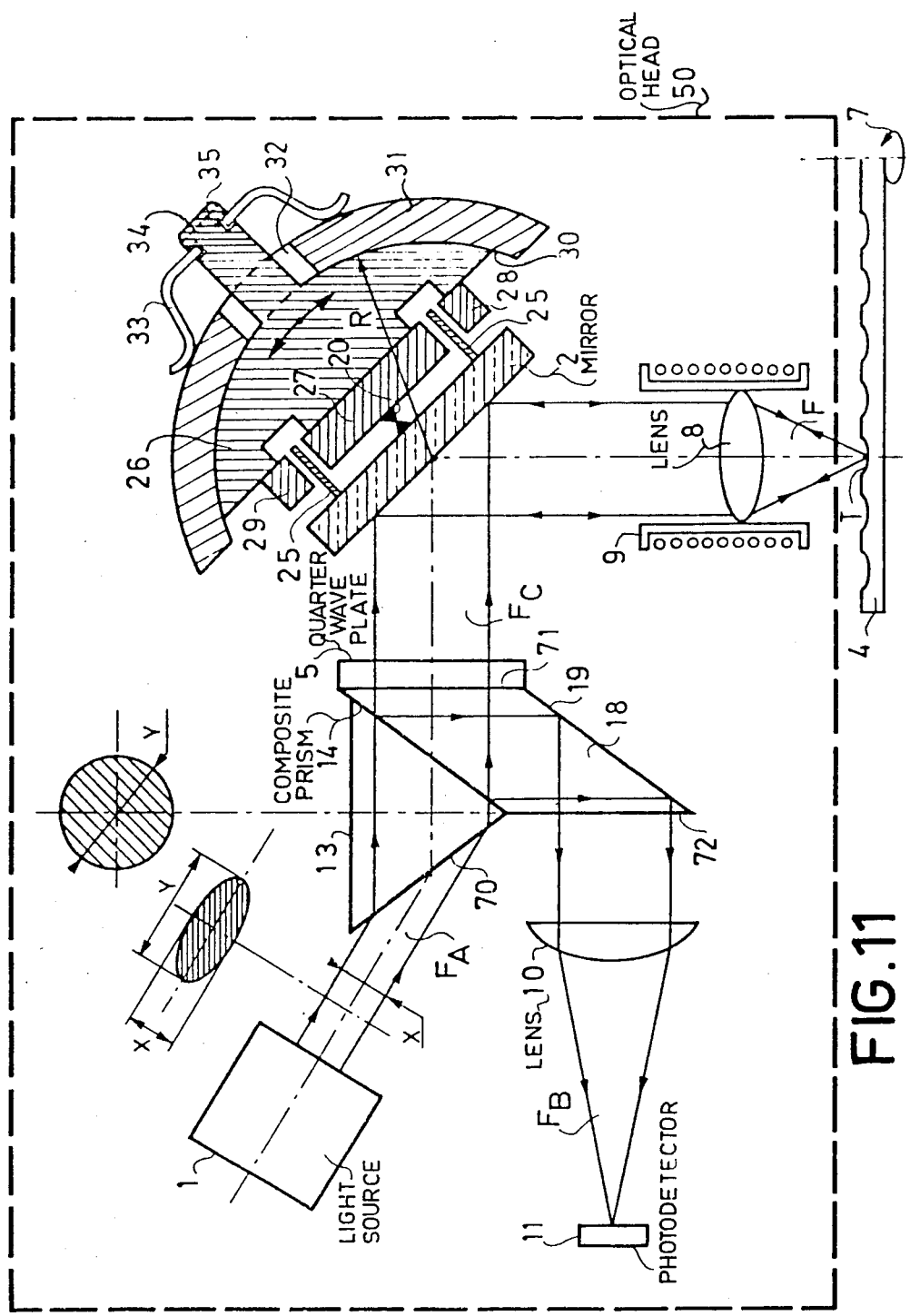
FIG. 11 illustrates one embodiment of an optical head in accordance with the invention.

FIG. 11 shows one embodiment of the optical head of the invention, integrating an adjustable mount such as described above.

A semi-conductor laser source emits a light beam $F_A$ with an elliptical section having dimensions X and Y respectively along the smaller axis and the large axis. This beam is received on an input facet 70 of a refringent optical block comprising a triangular prism 13, a quadrangular prism 18 which may be a right angled parallelepiped and a quarter - wave plate 5. Prism 13 receives the beam $F_A$ obliquely on its facet 70. This latter is suitably slanted with respect to beam $F_A$ so that the prism acts as an anamorphoser and delivers a beam with circular section of diameter Y. In addition the facet 14 of prism 13, common with the parallelepiped 18 and suitably treated, fulfils the role of beam splitter by polarization. The light whose polarization is perpendicular to the plane of the incidence is reflected in a direction not shown in FIG. 11. On the other hand, the light polarized in the incidence plane is transmitted, and passes through the parallelepiped 18 to facet 71 which will be called exchange facet. A quarter-wave plate 5 transforms the light with rectilinear polarization into light with circular polarization. The resulting beam $F_C$ is reflected from mirror 2 towards a lens 8 which focuses it a point 7 on disk 4.

According to the information situated at point T, the beam is reflected towards lens 8, mirror 2, the quarter-wave plate 5. This latter transforms the light with circular polarization into light with rectilinear polarization in a plane perpendicular to the incidence plane. The beam is transmitted to the exchange face 71 of the parallelepiped 18. Facet 14 of prism 13 reflects the beam to facet 19 of the parallelepiped 18 which reflects it in its turn to the output facet 72. A converging lens 10 focuses the beam on a photodetector 11 which finally measures the amount of light received and its distribution.

We find again in this head, the spherical pivoting seat 26 supporting mirror 2 and pivot 20. The pivoting seat 26 is housed in a spherical cavity 30 of radius R in base 31. Mirror 2 and pivot 20 are fixed to the flat face of seat 26 with the center O of the spherical surfaces situated in the reflecting plane of mirror 2.

Base 31 has an opening 32 for the passage and movement of a crank 34 integral with seat 26. A spring 33 engaged in notches 35 of the crank urges seat 26 against the inner wall of cavity 30. In addition, seat 26 can be operated by means of crank 34 during adjustment of the position of the mirror.

Furthermore, the use will be noted of a parallelepipedic diopter 18 which, associated in a simple way, so without adjustment, with prism 13 allows the beam coming from disk 4 to be reflected in a direction substantially parallel to the beam $F_A$ emitted by the laser source 1. This arrangement has the advantage of making the head more compact.

Finally, a control device, not shown in the Figure, operating under the control of the photodetector 11 as a function of the centering and focusing of the beam on photodetector 11, serves for controlling a device 9 for focusing lens 8 and for orientating mirror 2. The device for controlling mirror 2 is represented by an electrodynamic device comprising a moving coil 25 fixed to mirror 2 and three ferrite blocks 27, 28, 29 integral with the seat 26 and situated on each side of coil 25. A current flowing through the moving coil causes mirror 2 to rotate with respect to its pivot 20.

Figure 12:
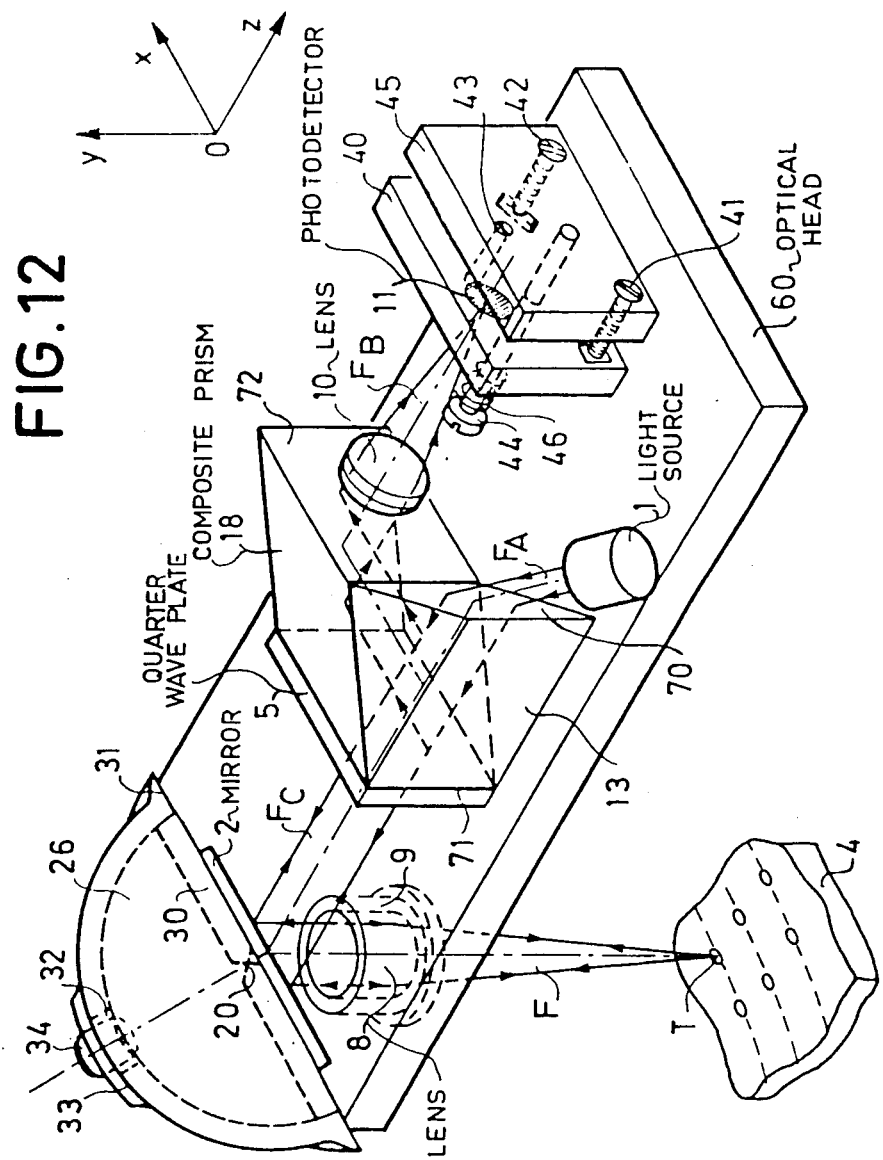
FIG. 12 illustrates in perspective one embodiment of an optical head in accordance with the invention.

The optical head shown in FIG. 12 gives an arrangement of the elements of the head such that this latter has an elongate and compact shape.

The optical head has an elongate frame 60 disposed in a plane xOz and whose large dimension is orientated along an axis Oz. On frame 60 are disposed, along axis Oz, successively the source 1 and the photodetector 11, then the prism 13-parallelepiped 18 assembly and finally a pivoting mirror 2 on its adjustable mount and lens 8.

Furthermore, source 1, the prism 13-parallelepiped 18 assembly, lens 10 and photodetector 11 are disposed in the plane xOz parallel to the plane of disk 4. The prism 13 and the parallelepiped 18 then have their base in this plane.

FIG. 12 also illustrates a mounting arrangement for the photodetector allowing angular and positional adjustment for focusing the photodetection cells.

A fixed piece 45 is mounted on a frame 60 of the head. Three countersunk screws 41, 42, 43 are screwed into piece 45 and emerge on the other side of piece 45. A mobile piece 40 is mounted against the points of screws 41, 42, 43 and is held against the these points, in accordance with the known dot-dash-plane, by a screw 44 screwed into piece 45 and a spring 46. The detection cells 11 are fixed to the mobile piece 40, on the face visible from lens 10, substantially at the focusing point of lens 10. By acting on screws 41, 42, 43, adjustment of the position of the detection cells 11 can be easily obtained.

The optical operation of this head is the same as described in connection with FIG. 11. On the other hand, in FIG. 12, the advantages of simplicity of construction, compact and generally elongate form of the head as well as simplicity of adjustment are more apparent.

Another variant of the invention could consist in an arrangement of frame 20 along a plane yOz perpendicular to the tracks of the disk. An assembly equivalent to that of FIGS. 11 would be obtained. It would then be advisable to provide devices for fixing the different elements of the head to frame 60.

What is claimed is:

1. Optical device for recording or retrieving information signals at a surface of an information medium, said device comprising:

solid state laser source means for emitting a collimated beam of rectilinearly polarized radiant energy;

lens means for focussing said radiant energy at said surface;

polarization splitting optical means refracting said collimated beam for feeding said lens means;

quarter wave polarization means arranged between said surface and said polarization splitting optical means for converting the rectilinear polarization of said emitted radiant energy into circular polarization; and photodetector means arranged for collecting reflected radiant energy emerging from the portion of said surface illuminated with said focussed radiant energy, said reflected radiant energy being refracted by said lens means, said quarterwave polarization means and said polarization splitting optical means;

said polarization splitting optical means having a first and a second prism shaped refracting element fitting one another along a common polarization splitting face; said first refracting element having an entry face for collecting said collimated beam; said second refracting element having an axit face for supplying said reflected radiant energy to said photodetector means, a reflective face and an exchange face optically coupled with said lens means; said entry face being arranged for obliquely receiving said collimated beam; said exit face and said exchange face being arranged for respectively refracting at normal incidence said reflected radiant energy to said photodetector means and said radiant energy to said lens means respectively;

a pivoting mirror arranged downstream of said polarization splitting refringent means for reflecting toward said lens means the radiant energy emerging from said exchange face; and an adjustable mount for said pivoting mirror comprising a cradle shaped base having a sliding surface with a center of curvature O, a pivoting seat having a sliding surface with the same curvature as the preceding surface and against which it is applied, said mirror being supported by the pivoting seat so that the center of curvature O is in the reflecting plane of the mirror.

2. Optical device as claimed in claim 1, wherein said quarter wave polarization means is fitted to said exchange face.

3. Optical device as claimed in claim 1, wherein said first prism shaped refracting element is a triangular prism.

4. Optical device as claimed in claim 3, wherein said second prism shaped refracting element is a parallelepipedic block.

5. Optical device as claimed in claim 1, wherein said pivoting mirror has a pivoting axis perpendicular to the plane of incidence of the radiant energy issuing from said exchange face.

6. Optical device as claimed in claim 1, wherein said pivoting mirror has a pivoting axis parallel to the plane of incidence of the radiant energy issuing from said exchange face.

7. Optical device as claimed in claim 1, wherein said solid state laser source means and said polarization splitting means are resting on a supporting frame; said pivoting mirror being fixed to a support rotatable in relation with said supporting frame.

8. Optical device as claimed in claim 7, wherein said lens means comprise a lens and means for controlling the focussing of said lens; said device further comprising means for securing track following in said surface by orientation of said pivoting mirror.

9. Optical device as claimed in claim 8, wherein said photodetector means are carried by said supporting frame through the agency of a supporting member which is displaceable and tiltable in relation with said supporting frame.

10. Optical device as claimed in claim 1, wherein said exit face and said exchange face are oriented parallel to one another.

11. The optical device as claimed in claim 1, wherein said sliding surfaces are coaxial cylinders with the same radius, the axis of the cylinders being in the reflecting plane of said mirror.

12. The optical device as claimed in claim 1, wherein said sliding surfaces are portions of coaxial spheres with the same radius, the center O of the spheres being in the reflecting plane of the mirror.

13. The optical device as claimed in claim 1, wherein said pivoting seat has a crank, said base has an opening for the passage and the movement of said crank and resilient means act on said crank and said base for applying said pivoting seat against the sliding surface.

14. The optical device as claimed in claim 1, further comprising a frame of elongate shape divided into three zones in the direction of its largest dimension, two end zones and a median zone said light source and said photodetector means being disposed in one of said end zones of the frame, said polarization splitting optical means being disposed in the median zone, said pivoting mirror and its adjustable mount as well as said focusing lens being disposed in the other end zone.

15. The optical device as claimed in claim 14, wherein said polarization splitting optical means comprises an input facet oriented towards said laser source and receiving the light beam emitted by said laser source, an exchange facet orientated towards said mirror, receiving, on the one hand, the beam transmitted by said input facet and transmitting it to said mirror and an output facet orientated towards said photodetectors receiving the beam coming from said mirror through the exchange facet and transmitting it to said photodetector means.

16. The optical device as claimed in claim 15, wherein said polarization splitting optical means comprises a prism with triangular base, and a prism with a quadrangular base having a face common with said triangular prism, said exchange facet and said output face being two free and opposite faces of the quadrangular based prism, said input facet being the free face of the triangular prism forming a dihedron with the output facet.

17. The optical device as claimed in claim 16, wherein said triangular prism and said quadrangular prism rest on a face of said frame by their base; said source being adapted to emit a beam also parallel to the face of said frame, the focusing lens having its optical axes perpendicular to said face of said frame.

18. The optical device as claimed in claim 17, wherein said photodetector means comprise detection cells placed on a platform having means for adjusting depth and slope with respect to the direction of said incident beam.

* * * * *